(12) United States Patent
Staib

(10) Patent No.: US 7,959,201 B2
(45) Date of Patent: Jun. 14, 2011

(54) GEAR DAMPER

(75) Inventor: Randy Staib, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 12/181,372

(22) Filed: Jul. 29, 2008

(65) Prior Publication Data

US 2010/0025142 A1    Feb. 4, 2010

(51) Int. Cl.
*B60N 3/12*    (2006.01)
(52) U.S. Cl. ..................................... 296/37.12
(58) Field of Classification Search ............... 296/37.12, 296/37.1, 37.7, 37.8, 37.9, 76; 188/290; 464/68.3; 477/130, 131; 192/208
See application file for complete search history.

(56) References Cited

U.S. PATENT DOCUMENTS

| | | | |
|---|---|---|---|
| 2,856,179 A * | 10/1958 | Hogan | 188/129 |
| 4,241,814 A * | 12/1980 | Masclet | 188/266 |
| 4,352,304 A * | 10/1982 | Warner | 74/498 |
| 4,677,868 A * | 7/1987 | Filkins | 74/359 |
| 4,756,210 A * | 7/1988 | Franklin et al. | 475/32 |
| 4,773,242 A * | 9/1988 | Smith | 70/455 |
| 4,869,125 A * | 9/1989 | Saigusa | 464/180 |
| 4,902,028 A * | 2/1990 | Serizawa et al. | 180/409 |
| 4,947,700 A * | 8/1990 | Kern et al. | 74/445 |
| 5,076,403 A * | 12/1991 | Mitsui | 188/267.1 |
| 5,211,267 A * | 5/1993 | Clark | 188/276 |
| 5,257,681 A | 11/1993 | Shtarkman et al. | |
| 5,259,487 A | 11/1993 | Petek | |
| 5,269,397 A * | 12/1993 | Kawamoto et al. | 188/290 |
| 5,349,883 A * | 9/1994 | Reik et al. | 464/68.3 |
| 5,381,877 A * | 1/1995 | Kobayashi | 188/290 |
| 5,413,317 A * | 5/1995 | Spoerre | 267/134 |
| 5,433,666 A | 7/1995 | Graton et al. | |
| 5,522,485 A * | 6/1996 | Takahashi et al. | 188/306 |
| 5,678,460 A * | 10/1997 | Walkowc | 464/180 |
| 5,697,847 A * | 12/1997 | Meyer | 464/97 |
| 5,839,548 A | 11/1998 | Parker et al. | |
| 5,876,306 A * | 3/1999 | Murata | 477/175 |
| 5,992,582 A * | 11/1999 | Lou et al. | 188/267.1 |
| 6,089,469 A * | 7/2000 | Fusama et al. | 239/71 |
| 6,352,143 B1 * | 3/2002 | Niaura et al. | 188/267.1 |
| 6,353,733 B1 * | 3/2002 | Murray et al. | 455/90.1 |
| 6,416,127 B1 * | 7/2002 | Galbreath et al. | 297/216.13 |
| 6,463,736 B1 * | 10/2002 | Pohl et al. | 60/326 |
| 6,637,558 B2 * | 10/2003 | Oliver et al. | 188/267.2 |
| 6,662,912 B2 | 12/2003 | Smith, Jr. et al. | |
| 6,672,573 B2 * | 1/2004 | Berton | 267/136 |
| 6,694,856 B1 * | 2/2004 | Chen et al. | 89/43.01 |
| 6,729,447 B2 | 5/2004 | Takahashi | |
| 6,752,425 B2 * | 6/2004 | Loh et al. | 280/779 |
| 6,782,242 B1 * | 8/2004 | Koleda et al. | 455/90.3 |
| 6,789,831 B2 * | 9/2004 | Schmidt et al. | 296/37.13 |
| 6,968,929 B2 | 11/2005 | Doornbos et al. | |
| 7,048,098 B1 * | 5/2006 | Moradian | 188/306 |
| 7,065,829 B2 * | 6/2006 | Okabayashi et al. | 16/51 |
| 7,152,718 B2 | 12/2006 | Doornbos et al. | |
| 7,232,016 B2 * | 6/2007 | Namuduri | 188/267.2 |
| 7,350,629 B2 | 4/2008 | Anton et al. | |

(Continued)

*Primary Examiner* — Kiran B. Patel
(74) *Attorney, Agent, or Firm* — Mark E. Duell, Esq.; Emerson Thomson Bennett

(57) ABSTRACT

A vehicle may have a device that is movably connected to the vehicle and a gear damper used to control the motion of the device. If the vehicle is subjected to crash acceleration, the viscosity of the damper fluid increases to prevent the motion of the device.

10 Claims, 4 Drawing Sheets

U.S. PATENT DOCUMENTS

| | | | |
|---|---|---|---|
| 7,354,363 B2 * | 4/2008 | Foster et al. | 474/110 |
| 7,402,147 B1 | 7/2008 | Allen | |
| 2001/0036266 A1 * | 11/2001 | Gronroos et al. | 379/433.01 |
| 2003/0189375 A1 * | 10/2003 | Raad | 303/20 |
| 2006/0150760 A1 * | 7/2006 | Maguire et al. | 74/331 |
| 2007/0149079 A1 | 6/2007 | Vito et al. | |
| 2009/0017993 A1 * | 1/2009 | Khanicheh et al. | 482/49 |
| 2010/0025142 A1 * | 2/2010 | Staib | 180/271 |

* cited by examiner

GEAR DAMPER

I. BACKGROUND OF THE INVENTION

A. Field of Invention

This invention pertains to the art of methods and apparatuses for gear dampers, and more specifically to methods and apparatuses for providing a vehicular gear damper that prevents the motion of devices during a crash situation.

B. Description of the Related Art

It is known in the automotive industry to provide vehicles with a gear damper. Gear dampers are often used in automotive interior applications to control the moving speed of components such as pocket lids, trays and glove boxes. Typically, a gear damper includes a main housing, a damper paddle, damper fluid, and a gear that is attached to the component. The main housing has a cavity into which the damper fluid is sealed. The damper paddle is connected to the gear at one end and at the opposite end extends into the damper fluid within the housing cavity. As the gear and damper paddle are rotated, the damper paddle must move through the damper fluid. The viscosity of the damper fluid limits the movement of the damper paddle and thus controls the rotational speed of the gear and the component.

While known gear dampers generally work well for their intended purpose, they have limitations. One limitation is related to the fact that governmental regulations require that interior components, such as compartment lids and doors, remained closed during a relatively high gravity force (G-force) crash situation. Achieving both the moving speed control of the component and also the regulation requirement is difficult. Typically a secondary device, such as G-force sensor lock, is required to keep the component from moving or opening during a crash situation. G-force sensor locks are generally large compared to available space and require considerable time to tune and test for proper function.

What is needed is a gear damper that can provide the motion control of known gear dampers but that can also provide the ability to keep the corresponding component closed during a crash situation.

II. SUMMARY OF THE INVENTION

According to one embodiment of this invention, a gear damper comprises: (1) a housing having a cavity; (2) damper fluid located within the cavity; (3) a gear having at least one gear tooth; and (4) a damper member having a first portion operatively connected to the gear and a second portion received within the cavity and in contact with the damper fluid. Subjecting the gear damper to a first acceleration causes the damper fluid to have a first viscosity. Subjecting the gear damper to a second acceleration that has an absolute value that is greater than the absolute value of the first acceleration causes the damper fluid to have a second viscosity that is greater than the first viscosity.

According to another embodiment of this invention, a vehicle comprises: (A) a frame; (B) a body mounted to the frame and defining a passenger compartment and a locomotion compartment; (C) a locomotion device mounted to the frame and positioned within the locomotion department; (D) a device that is movably connected to the vehicle, the device having a gear portion; and, (E) a gear damper comprising: (1) a housing operatively attached to the vehicle, the housing having a cavity; (2) a damper fluid located within the cavity; (3) a gear member engaged with the gear portion of the device; and, (4) a damper member having a first portion operatively connected to the gear member and a second portion received within the cavity and in contact with the damper fluid. Subjecting the vehicle to non-crash acceleration causes the damper fluid to have a first viscosity permitting the application of a first force to the device to cause the device to move relative to the vehicle. Subjecting the vehicle to crash acceleration causes the damper fluid to have a second viscosity that is greater than the first viscosity preventing the application of the first force to the device from causing the device to move relative to the vehicle.

According to yet another embodiment of this invention, a method comprises the steps of: (A) providing a vehicle having a device that is movably connected to the vehicle, the device having a gear portion; (B) providing a motion damper comprising: (1) a housing operatively attached to the vehicle, the housing having a cavity; (2) a damper fluid located within the cavity; (3) a gear member engaged with the gear portion of the device; and, (4) a damper member having a first portion operatively connected to the gear member and a second portion received within the cavity and in contact with the damper fluid; (C) subjecting the vehicle to non-crash acceleration that causes the damper fluid to have a first viscosity permitting the application of a first force to the device to cause the device to move relative to the vehicle; and, (D) subjecting the vehicle to crash acceleration that causes the damper fluid to have a second viscosity that is greater than the first viscosity preventing the application of the first force to the device from causing the device to move relative to the vehicle.

One advantage of this invention is that a gear damper can be used to both control the motion of a vehicle component and to prevent its motion during crash acceleration.

Another advantage of this invention is that vehicle components can be prevented from motion during crash acceleration without the need for a G-force sensor lock, or the like.

Still other benefits and advantages of this invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
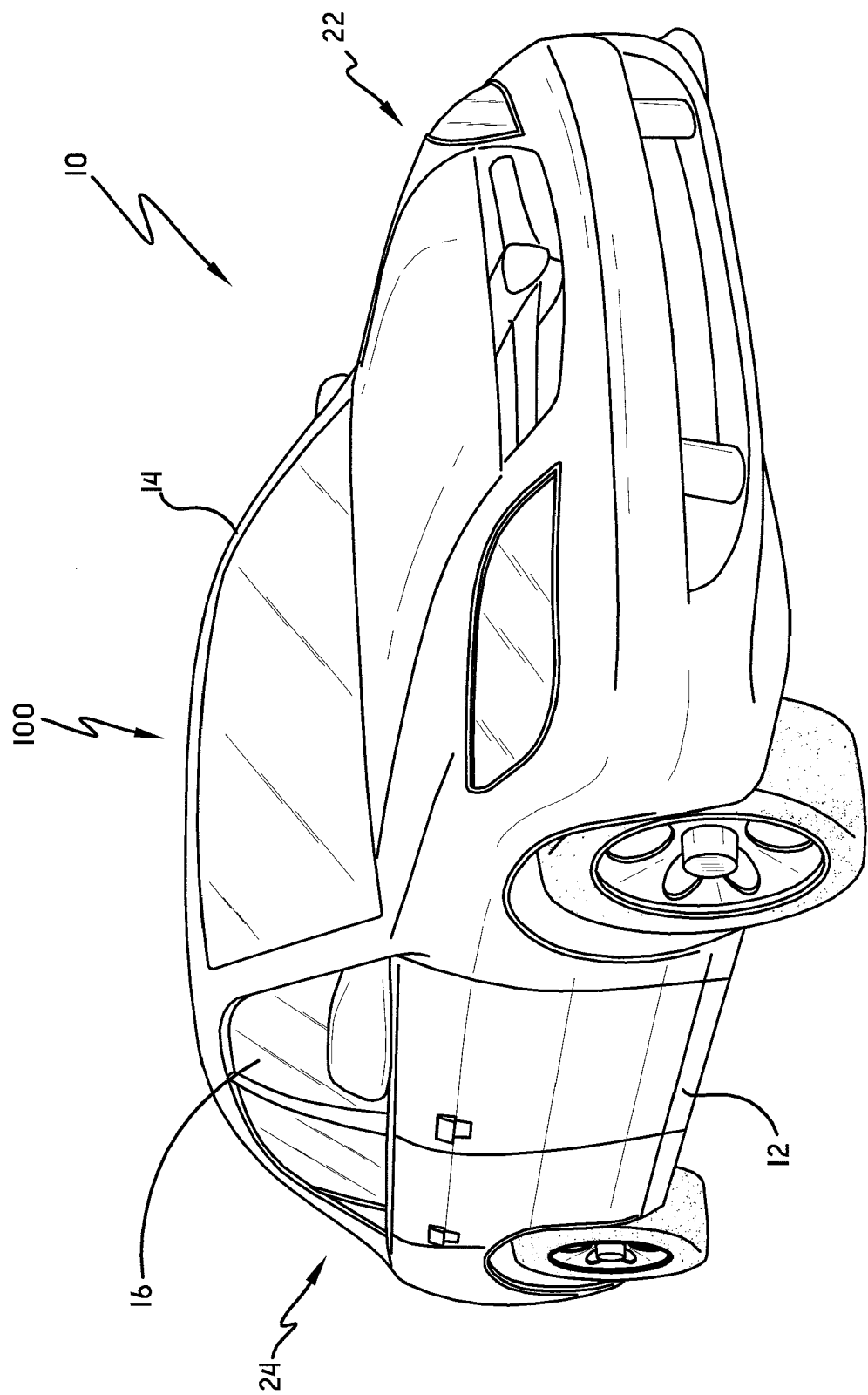
FIG. 1 is a perspective front view of a vehicle equipped with a gear damper according to this invention.

Referring now to the drawings wherein the showings are for purposes of illustrating embodiments of the invention only and not for purposes of limiting the same, FIG. 1 shows a vehicle 10 equipped with at least one gear damper 100 according to this invention. It should be noted that while an automotive passenger vehicle 10 is shown, the inventive gear damper 100 will work well with other vehicles including airplanes, boats, trucks, motorcycles, all terrain vehicles (ATVs), sport utility vehicles (SUVs), vans, etc. and for other purposes as well. The vehicle 10 may include a vehicle frame 12 and a body 14 that is supported on the frame 12. The body 14 may define a passenger compartment 16, which is equipped with one or more seats to receive one or more passengers as is well known in the art. The body 14 may also define a locomotion compartment 22 and a storage compartment (or trunk) 24. The locomotion compartment 22 contains at least one locomotion device to provide the power to move the vehicle 10 from place to place. The particular locomotion device can be any chosen with the judgment of a person of skill in the art such as an internal combustion engine, an electric motor, or a hybrid.

Figure 2:
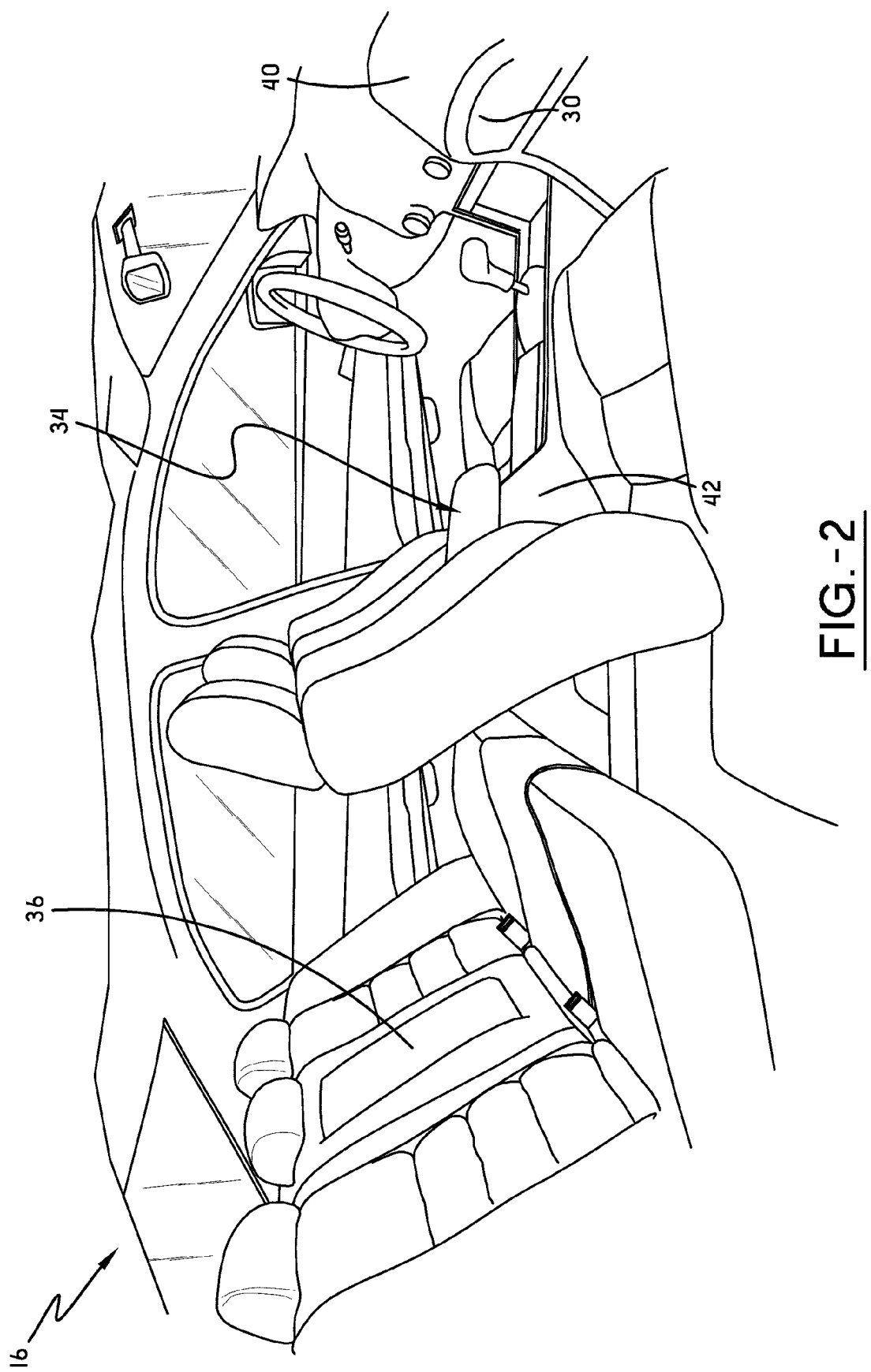
FIG. 2 is a side view of a portion of the interior of the vehicle shown in FIG. 1.
Figure 3:
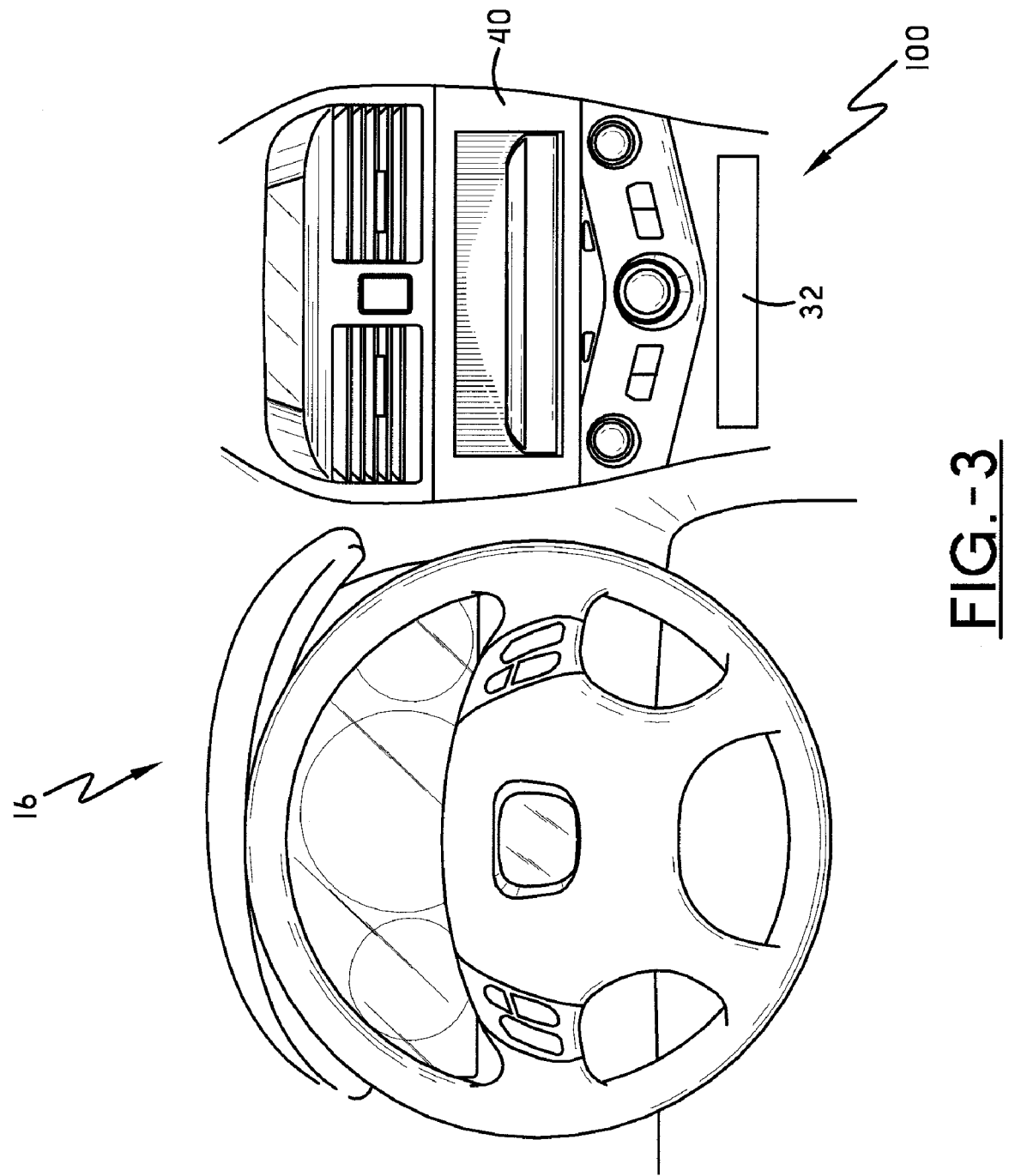
FIG. 3 is a rear view of a portion of the interior of the vehicle shown in FIG. 1.

With reference now to FIGS. 1-3, the vehicle 10 may include one or more components that move using a gear damper 100 according to this invention. Some non-limiting examples include a pivotal glove box lid 30, an extendable tray 32, a pivotal storage compartment lid 34, and a pivotal arm rest 36. While the glove box lid 30 and the extendable tray 32 are mounted to the dash board 40, the storage compartment lid 34 is mounted to a console 42 positioned between a pair of front seats, and the arm rest 36 is positioned between a pair of back seats, it is to be understood that the particular component used with this invention and its location in the vehicle 10 can be any chosen with the sound judgment of a person of skill in the art. The automobile 10 may also include some or all of the conventional components of an automobile that are well known in the art.

Figure 6:
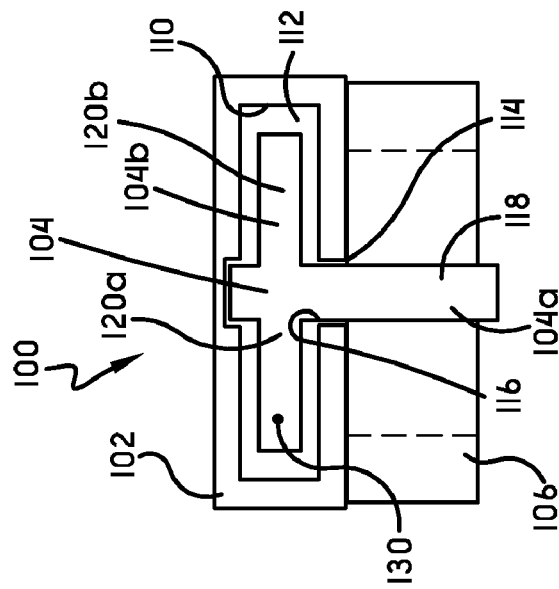
FIG. 6 is a sectional view of the gear damper taken along line 6-6 in FIG. 5.
Figure 5:
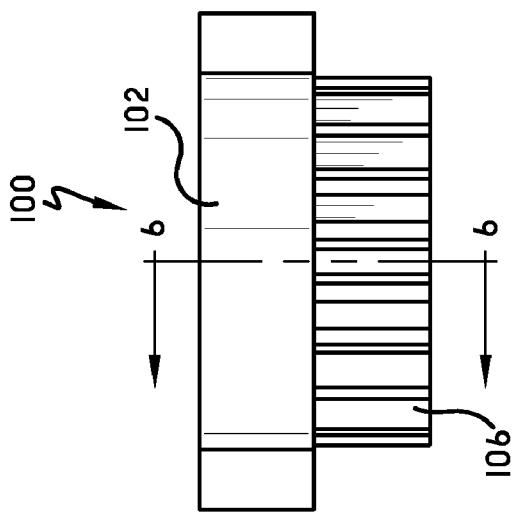
FIG. 5 is a side view of the gear damper shown in FIG. 4.
Figure 4:
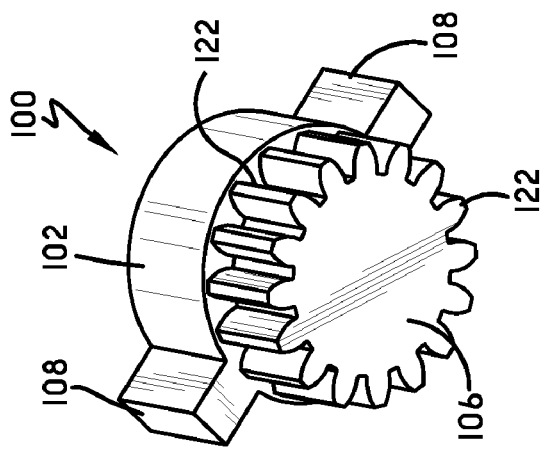
FIG. 4 is a perspective view of a gear damper according to one embodiment of this invention.

With reference now to FIGS. 4-6, various embodiments of the gear damper 100 will now be described. The gear damper 100 may include a housing 102, a damper member 104 (see FIG. 6), and a gear 106 that is operatively connected to the vehicle component that is motion controlled by the gear damper 100. The housing 102 is attached to a portion of the vehicle 10 that is to remain fixed with respect to the component to be moved. This attachment can be made in any manner chosen with the judgment of a person skilled in the art. In one specific embodiment, attachment fins 108 (see FIG. 4) can be used for this purpose. The housing 102 has a cavity 110 (see FIG. 6) that receives a damper fluid 112 and a portion of the damper member 104, as will be discussed further below. A fluid seal 114 seals an opening 116 that provides the only entry to the cavity 110 and into which the damper member 104 extends. The seal 114 may be formed in any manner and of any material chosen with the sound judgment of a person of skill in the art in order to be compatible with the fluid 112. In one non-limiting embodiment, the seal 114 may be formed of a rubber material.

With continuing reference to FIGS. 4-6 but especially FIG. 6, the damper member 104 may have, as shown, a first portion 104a operatively connected to the gear 106 and a second portion 104b received within the cavity 110. In one embodiment, the damper member 104 may have a shaft 118 with one end fixed to the gear 106 in any manner chosen with the skill of a person of skill in the art. The opposite end of the shaft 118 may have at least one paddle 120, two shown 120a, 120b, that extends laterally from the shaft 118 and is received within the cavity 110. Rotation of the gear 106, and thus of the shaft 118, causes the paddle 120 to move through the damper fluid 112 with the viscosity of the damper fluid 112 controlling the rotational speed, as is known in the art. It should also be noted that variations in the paddle 120 design can also be used with a given viscosity of the damper fluid 112 to control the motion of the damper member 104. As a general rule, the larger the paddle 120 the larger the force that is required to move the paddle 120 through the damper fluid 112 and thus to move the damper member 104. Similarly, the smaller the paddle 120 the smaller the force that is required to move the paddle 120 through the damper fluid 112 and thus to move the damper member 104. In another embodiment, the paddle 120 may have one or more openings 130, one shown in FIG. 6, that permit damper fluid 112 to pass from one side of the paddle 112 to the other as the paddle 112 is moved through the damper fluid 112. By controlling the size, number, and location of the opening 130, the motion of the paddle 120 through the damper fluid 112 and thus the motion of the damper member 104 can be controlled, as understood by a person of skill in the art.

Still referring to FIGS. 4-6, the gear 106 may have a generally circular cross-section with at least one tooth 122, multiple teeth shown, that engages with a gear portion (not shown) mounted on the vehicle component to be moved in a well known manner. For one non-limiting example, the gear portion may be circular rotating gear similar to the gear 106, as shown. For another non-limiting example, the gear portion may be a linear gear, sometimes referred to as a "rack." In yet another non-limiting example, the gear portion may be a curvilinear rack. As the nature and operation of gear portions are well known, no further discussion will be provided here. While the gear 106 shown is a spur gear, it should be understood that the gear damper 100 of this invention will work well with any gear type chosen with the judgment of a person of skill in the art including but not limited to, helical gears, bevel gears, worm gears, and pinion gears in engagement with a rack gear (as discussed above.)

With reference now to FIG. 6, embodiments of the damper fluid 112 that may be used with this invention will now be discussed. The damper fluid 112 may be non-Newtonian and may have the characteristic of increasing in viscosity when exposed to a high G-force situation, such as a vehicle crash situation. More specifically, during a high G-force situation, the gear 106 and damper paddle 120 may accelerate and exert a large force on the damper fluid 112. This force may then increase the viscosity of the damper fluid 112 to the point where rotation of the damper member 104 (and thus rotation of the gear 106) is prevented. When the high G-force situation is over, the viscosity of the damper fluid 112 may return to its initial value, permitting rotation of the damper member 104 and gear 106. It should be noted that the specific value used to define a high G-force situation can be any value chosen with the sound judgment of a person of skill in the art. In one embodiment, the high G-force situation for the damper fluid 112 may be set to match the G-force level required to deploy the vehicle's airbag or airbags (not shown). In another embodiment, the high G-force situation for the damper fluid 112 may be set to be lower than the G-force level required to deploy the vehicle's airbag(s). In this case, the motion of the damper member 104 is prevented, during a vehicle crash condition, prior to the deployment of the airbag. In one specific non-limiting example, an airbag may be set to deploy at a G-force of 15 times the force exerted by gravity (commonly referred to as "15Gs") while the high G-force situation for the damper fluid 112 may be set at a G-force of 12 times the force exerted by gravity ("12Gs"). The inventor has not developed a precise fluid to act as the damper fluid 112. The inventor contemplates, however, that one embodiment of the damper fluid 112 may include a cornstarch/water mixture.

With continuing reference to FIG. 6, it should also be noted that the precise viscosities of the damper fluid 112 used with this invention can be determined based on the sound judgment of a person skilled in the art as they may depend on the specific application. If, for example, the vehicle component being motion controlled is relatively heavy, then the damper fluid 112 high G-force viscosity may need to be relatively higher to prevent motion of the vehicle component being motion controlled. In one embodiment, the damper fluid 112 viscosity varies linearly with the G-force. In another embodiment, the damper fluid 112 viscosity varies exponentially with the G-force. Such an exponential variation may provide a relatively more sudden "motion-switch-off" characteristic in preventing motion of the damper member 104. In one embodiment, the damper fluid 112 viscosity varies with the atmospheric temperature. In another embodiment, the damper fluid 112 viscosity does not vary with the atmospheric temperature.

With reference now to all the FIGURES, the operation of the gear damper 100 will now be described. First, the gear damper 100 is attached to the vehicle component being motion controlled. More specifically, the housing 102 is attached to a portion of the vehicle 10 which does not move relative to the component that does move. The gear 106 is engaged with the gear portion of the component to be moved. As noted above, this component can be any chosen with the judgment of a person of skill in the art. Non-limiting examples for this component include a glove box lid 30, a tray 32, a storage compartment lid 34, and an arm rest 36.

With continuing reference to all the FIGURES, once the gear damper 100 is attached, as long as the vehicle 10 is subjected to non-crash acceleration conditions the viscosity of the damper fluid 112 remains at a value permitting limited motion of the damper member 104 and gear 106. As a result, the application of a force to the component by a person in the vehicle 10 will permit controlled movement of the component. If, however, the vehicle 10 is subjected to crash acceleration conditions the viscosity of the damper fluid 112 increases to a value preventing motion of the damper member 104, gear 106, and component. As a result, the application of the same force to the component that moved the component during non-crash conditions is no longer sufficient to move the component.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A gear damper comprising:
    a housing having a cavity;
    damper fluid located within the cavity;
    a gear having at least one gear tooth;
    a damper member having a first portion operatively connected to the gear and a second portion received within the cavity and in contact with the damper fluid;
    wherein subjecting the gear damper to a first acceleration causes the damper fluid to have a first viscosity; and,
    wherein subjecting the gear damper to a second acceleration that has an absolute value that is greater than the absolute value of the first acceleration causes the damper fluid to have a second viscosity that is greater than the first viscosity.

2. The gear damper of claim 1 wherein the gear and damper member are rotatably connected to the housing.

3. The gear damper of claim 1 further comprising:
    a seal that keeps the damper fluid within the cavity.

4. The gear damper of claim 1 wherein the damper member comprises:
    a shaft having first and second ends, wherein the first end is connected to the gear; and,
    a first paddle that extends laterally from the second end of the shaft and that is received within the cavity.

5. The gear damper of claim 4 wherein the damper member further comprises a second paddle that that extends laterally from the second end of the shaft in a direction substantially opposite to the first paddle and that is received within the cavity.

6. The gear damper of claim 4 wherein the first paddle has at least one opening that permits the damper fluid to move through the opening as the first paddle is moved through the damper fluid.

7. The gear damper of claim 1 wherein the damper fluid is non-Newtonian.

8. The gear damper of claim 1 wherein the damper fluid comprises:
    cornstarch; and,
    water.

9. The gear damper of claim 1 wherein the viscosity of the damper fluid varies substantially linearly with the acceleration subjected to the gear damper.

10. The gear damper of claim 1 wherein the viscosity of the damper fluid varies substantially exponentially with the acceleration subjected to the gear damper.

* * * * *